(12) United States Patent
Nelson

(10) Patent No.: US 7,028,844 B2
(45) Date of Patent: Apr. 18, 2006

(54) DRIED LAVENDER FLOWER SEPARATOR SYSTEM AND METHOD

(76) Inventor: Robert D. Nelson, 751 Heath Rd., Sequim, WA (US) 98382

( * ) Notice: Subject to any disclaimer, the term of this patent is extended or adjusted under 35 U.S.C. 154(b) by 63 days.

(21) Appl. No.: 10/892,753

(22) Filed: Jul. 16, 2004

(65) Prior Publication Data

US 2005/0011812 A1    Jan. 20, 2005

Related U.S. Application Data

(60) Provisional application No. 60/488,671, filed on Jul. 17, 2003, provisional application No. 60/488,521, filed on Jul. 18, 2003.

(51) Int. Cl.
*B07B 4/00*  (2006.01)
*B07B 7/00*  (2006.01)

(52) U.S. Cl. .................. 209/135; 209/142; 209/146; 209/2; 209/3

(58) Field of Classification Search ............... 209/2, 209/3, 135, 143, 146; 241/200
See application file for complete search history.

(56) References Cited

U.S. PATENT DOCUMENTS

| 4,418,871 A | * | 12/1983 | Powell ........................... 241/1 |
| 4,851,110 A | * | 7/1989 | Rolle et al. .................. 209/135 |
| 5,032,256 A | * | 7/1991 | Vickery ....................... 209/135 |

* cited by examiner

*Primary Examiner*—Donald P. Walsh
*Assistant Examiner*—Kaitlin Joerger
(74) *Attorney, Agent, or Firm*—Innovation Law Group, Ltd.; Jacques M. Dulin, Esq.

(57) ABSTRACT

An improved dried lavender processing apparatus and method comprises a multi-module system comprising a first de-stemmer unit that receives the dried lavender in bundles, separates the buds (corollas/calyxes) from the stems and leaves, collects the stems and leaves as waste, and provides the buds to a second separator/classifier unit. The second, separator/classifier unit employs air or vacuum transport to convey, separate and classify the final bud product from the minor stem, leaves and minor debris and to exhaust and remove the hazardous dust and organic particulates. The system may include a third unit comprising a dust collector system. The final product flower buds are collected in an output hopper in clean condition for immediate bagging as a potpourri or sachet product, or may be further processed for the essential oils.

20 Claims, 8 Drawing Sheets

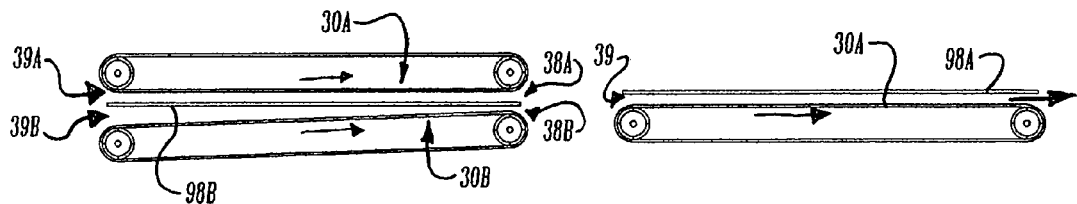
FIGURE 10B  FIGURE 10A
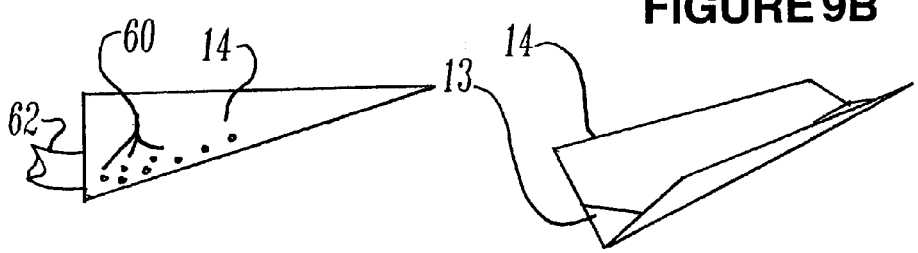
FIGURE 9A  FIGURE 9B
FIGURE 9C
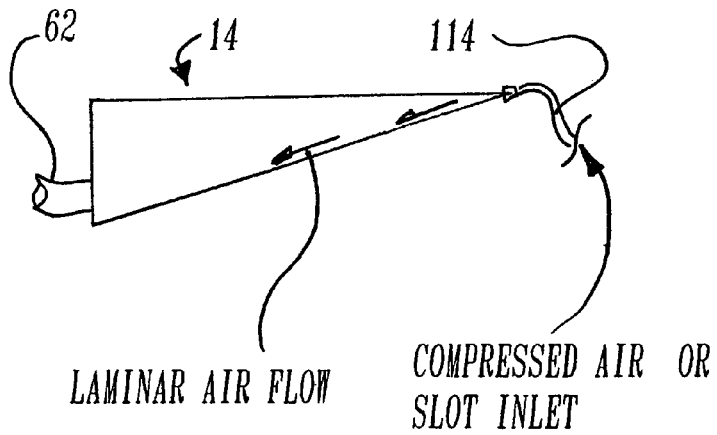
LAMINAR AIR FLOW   COMPRESSED AIR OR SLOT INLET

DRIED LAVENDER FLOWER SEPARATOR SYSTEM AND METHOD

CROSS REFERENCE TO RELATED APPLICATION

This application is related to Provisional Application No. 60/488,671, filed Jul. 17, 2003 and 60/488,521 filed Jul. 18, 2003 under the same title by the same inventor, the benefit of the filing date of which is claimed under 35 US Code 35 U.S.C. §§ 119.

FIELD

The invention relates to apparatus and methods for processing of agricultural crops and horticultural specimens, and more particularly to apparatus and methods for the removal of stems from the flower parts of dried herbs, such as lavender bunches, and the subsequent separation of the dried flower product from residual stem fragments and dust, to result in a clean dried lavender flower product that may be used for a variety of value added products, such as potpourri, sachets, soaps, perfumes and eux de toilette compositions, oil and fragrance essence extraction, and the like.

BACKGROUND

One of the major agricultural products of an herbal nature is lavender, an herbaceous shrub of the genus *Lavendula*, a member of the Mint family, known for its fernlike leaves and purple flowers. The dried flowers of lavender have been used for centuries as a fragrance source, particularly in sachets and potpourri, and they are further processed for fragrance essences and oils.

The uses of lavender flowers, leaves and oils includes use in medicinals, aromatherapy, cusine, perfumes, dyes, oils, toilet preparations, tinctures, distillation products (steam distillation of lavender oil), and the like. Different varieties have varying potentials. There are several types of lavender oil. The "true" lavender oil comes from *Lavandula angustifolia* and is the most highly prized oil. There is also spike lavender oil derived from *Lavandula latifolia*, and finally there is lavendin oil which comes from a *L. augustifolia×L. latifolia* hybrid cross.

True lavender is a native of the Mediterranean countries such as Italy, Spain and North Africa as well as Switzerland and France. The world production of this oil is estimated at about 200 metric tons/year. The lavendin oil-producing hybrid cross is also a native of the Mediterranean, but in recent years Bulgaria has become a major producer, and production is spreading to Australia and Tasmania. Lavendin oil is much cheaper and world wide production is thought to be about 1000 metric tons/year. Lavendin oils have been replacing lavender oil in recent years except for the most expensive products. Finally, spike lavender also comes from Spain and the Mediterranean but it thrives better in warmer climates than the other two species. World production is similar to lavender, about 150–200 metric tons/year, The variety *Lavandula intermedia* cv. Grosso, "fat spike," is very fragrant and is used as an oil source. Although regions of France and Italy are well known for commercial lavender growing and harvesting, lavender commercialization has become important in the United States, as many varieties grow well in zones 5–8. True lavender is a particularly important crop in the Sequim-Dungeness Valley region of Washington State's Olympic Peninsula, because its famous low rainfall, abundant sunshine, rocky, sandy soil and cool nights helps grow the heartiest, most lush lavender varieties in the US. The cool nights allow the flowers to mature slower. This causes the oils to concentrate more and increase in quality and scent.

Each lavender stem is crested with clusters of flower buds making up a flower head, also called an inflorescence. In all types of lavender, each individual flower bud is composed of two major parts: the calyx and the corolla. Both are a source of the flower's aromatic oils. The base of each calyx is attached to the flower stem. The calyx is tubular in shape and can be slightly hairy or nearly smooth (as with English lavenders) or quite rough and woolly (as with French lavender). The flower (corolla) emerges from the open end of the tubular calyx, which may, as with French lavender, end in a hoodlike shape. The corolla is slightly trumpet shaped and tubular, with five lobes. The corollas open randomly: portions of each flower head bloom, while other parts remain as hollow or seed-filled calyxes—although they start to bloom near the bottom of the flower heads.

The Spanish lavenders have showy, richly colored bracts (often called wings, rabbit ears, or flags in honor of their ornamental prominence) extending from the top of the flower head, which like all lavenders, is made up of calyxes with tiny blossoms (corollas). The less showy pale mauve bracts of French lavender protrude only slightly above the flower head, and are cupped together more like praying hands.

Typically the lavender is harvested in bloom or at the end of the blooming season. The stalks with flower heads are tied in bundles of from 30 to several hundred, then dried. Drying modes include air drying, oven drying, microwave drying, and freeze-drying. The most common process involves hanging bundles to dry in an inverted position in curing sheds or other facilities. The drying period ranges from several weeks to months, depending on the variety and the use, and the specific drying regimen, including heat and humidity.

Then the dried bundles of lavender are processed to remove the dried flower buds (corollas/calyxes) wherein the fragrance-containing essential oils are concentrated. The process has not changed in centuries: The dried inflorescences or spikes of buds are cut or snapped off the stems, and residual bracts, leaves and petals are shaken out, with the buds being collected. However, large quantities of particulates are produced in this process of separation, particularly as lavender flower heads comprise tight clusters of buds. These small buds and fine particulates include natural ambient dust particles that collected on the flowers during the growing season, and organic particulates created by the crushing of friable dried flower and stem parts.

The organic dust particles are a hazard to workers employed in the separation processing. They must wear masks, and many workers find that they are, to varying degrees, allergic to the particulates. The heavy dust load created in the processing results in worker discomfort ranging from sneezing, to eye irritation, to severe asthma-like reactions.

Further, this processing is labor intensive, repetitive and slow. In addition, it is not appealing to many workers, and training is problematic, as it takes a deft touch to properly handle the dried stems and flower heads without significant loss in yield.

Accordingly, there is a need in the art for a method and mechanical apparatus for processing of dried lavender that replicates the gentle handling of experienced workers, yet is faster and reduces the environmental dust hazards.

THE INVENTION

Summary of the Invention, Including Objects and Advantages

The inventive dried lavender processing apparatus and method comprises a multi-module system comprising a first de-stemmer unit that receives the dried lavender in bundles, separates the buds (corollas/calyxes) from the stems, leaves and bracts, collects the stems and leaves as waste, and provides the buds to the second unit. The second unit employs air or vacuum transport to convey, separate, classify and clean the final flower head product (the buds comprised of corollas/calyxes) from the minor stem pieces and the leaves, bracts and minor debris (possibly including empty calyxes, pebbles and other contaminants) and exhausting the hazardous dust and organic particulates. In an important option, the system may include a dust collector system, such as a baghouse or other dust filter system to collect the hazardous dust to meet local environmental discharge standards for agricultural process operations.

The final product flower buds are collected in an output hopper in clean condition for immediate bagging as a potpourri or sachet product components, or may be further processed for the essential oils.

The system has the significant commercial advantage of reducing the time to process by a factor in the range of 40x–50x. For example, current hand processing takes on the order of 3 minutes to process a bundle of 300 dried lavender stalks, while the inventive system can process the same amount in on the order of 4 seconds or less. In addition, the recovered flower head products (buds) are in condition equivalent to hand processing.

The de-stemmer unit includes an input hopper, a pair of opposed belts with decreasing nip in the direction of travel that advances the bundles of lavender, and an output discharge chute wherein the stems fall out as waste (the major debris) and the buds and other minor debris are vacuum or air conveyed to the second separator unit/classifier. In the de-stemmer, two things happen: 1) the buds are removed from the stems by the rolling action imparted to the bundles in the decreasing belt nip; and 2) the heads are gently broken apart into their component parts: calyxes, corollas and bracts (if any). Indeed, the stems drop out the discharge chute still banded or tied together as bundles. The belts are preferably oriented with the belt-drive rollers vertical, so the nip plane is vertical and they move the bundles horizontally during processing. This vertical orientation permits gravity assist in the collection of the product and minor debris in a hopper below the belts.

The separator/classifier second module includes a vacuum or air conveying source, a series of sorting gates and drop-out hoppers for the minor debris and the clean end-product flower buds, and an exhaust outlet for the dust discharge to the collector. The dust collector can be any suitable device, including, but not limited to, an electrostatic precipitator, a baghouse, a dust filter, a cyclone separator, and the like. The air conveying system may be an induced draft fan, a venturi conveyor, a forced draft blower, a compressed air assisted blower, or the like, or any combination thereof. The air conveying/separator system can be pulsed, for example, with a variable compressed air inlet, a rotating gate valve on the output end of a forced air fan or on the inlet side of the induced draft fan, or the like.

The product hopper can be a single hopper, or in the alternative, can include multiple baffles acting as sorting gates along with weight driven dispensers for classification of product flower buds by one or more of size and quantity.

The belts can be provided with a wide range of adjustment features to handle a wide variety of agricultural products, not simply lavender. The belts can be co-rotating or counter rotating, one or both driven, front belt driven or rear belt driven, have differential controllable speeds and can be product flow-sensor controlled. In one option, a finger chain assembly above the belts can assist in keeping adjacent bundles vertical, and spaced apart, as they travel horizontally to the waste stem output end of the de-stemmer apparatus.

The entire system can be oriented vertically, horizontally, or inclined at an angle. One unit can be horizontal or inclined, and the other vertical or inclined. For example, the de-stemmer unit can be generally horizontal with vertical nip plane and fed from one end for horizontal travel of product as being processed. Or the unit can be inclined at an angle, while the air cleaner/separator can be horizontal or inclined, bottom fed with side discharge for product and top discharge for dust.

The belts are presently preferred to have an inlet spacing of about 3–6", with an exemplary setting being about 3" (7–15 cm; exemplary, 7–8 cm) and an outlet spacing of less than 1" (approx. 2 cm) depending on the bundle stem diameter. The preferred embodiment has both belts driven on motorized forward shafts, with the opposing ends un-driven, supported on idler rollers. A suitable exemplary unit has a length of about 108" long by 16" wide, but the belt dimensions are easily selected by one skilled in the art based on the particular agricultural product being processed. Belt travel speed can be varied widely, typically on the order of 0.1 foot/sec to 1 foot/sec. A preferred type belt has some tooth or grooves to promote the rolling action to separate the buds from the stems (e.g., for spike lavender) and the buds from their component clusters (e.g., for Spanish lavender). The belt is typically a rough-surface polymer or rubber reinforced fabric belt, or a polymer-surfaced rubber belt.

Additional alternative embodiments of the invention include:

1) The bundles rotate as they proceed through the de-stemmer, and the belt-way can be made whatever length is needed to insure removal of the buds to a commercially acceptable yield level, and may include any standard belt tensioner assembly;

2) Only one of the two belts needs to be moving; the second may be stopped. Indeed, in an important alternative, there may be only one nip-gap adjustable ribbed belt facing, and spaced from, an opposed plate having a ribbed surface. In still another important alternative, a static plate having ribs on each side may be inserted in the nip between opposed belts, in the full longitudinal plane of the nip (both vertically and longitudinally), so that there are two bundle inlets, outlets and processing paths, thereby doubling production. Indeed, the instant inventive de-stemmer apparatus can be fitted with any combination of co-rotating and counter-rotating belts and static (fixed) plates there-between, in order to provide any plurality of product de-stemming process pathways;

3) The spacing of the nip(s) can be as small as about ¾" to 1.5 inches at the inlet end, decreasing to about ¼" to ¾" at the outlet end. In addition, the nip(s) can decrease in width from top to bottom as well as laterally in the direction of travel of the bundles to compensate for the base of the bundles being wider and less diffuse than the wider spread of the ends that carry the flower heads and buds. The nip can be visualized as a biaxial, compound wedge.

4) The collection hopper of the de-stemmer unit may have a V-shaped floor to assist in guiding the flower products toward the outlet where they are entrained in the vacuum conveyor system. In addition the hopper floor can be fitted with a vibrator, a laminar induced or compressed air flow slots (such as NACA slots) or inlets to help the flower product flow toward the outlet.

BRIEF DESCRIPTION OF THE DRAWINGS

The invention is described in more detail with reference to the drawings, in which:

FIG. 9 is a set of schematic isometric drawings showing variations in the bottom of the collection hopper of the de-stemmer unit; and FIG. 10 is a set of schematic plan views of de-stemmer units employing sub-assemblies of moving belts and static (fixed) plate to provide one or more generally parallel product processing paths.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Dried Lavender Processing System Modules

Figure 1:
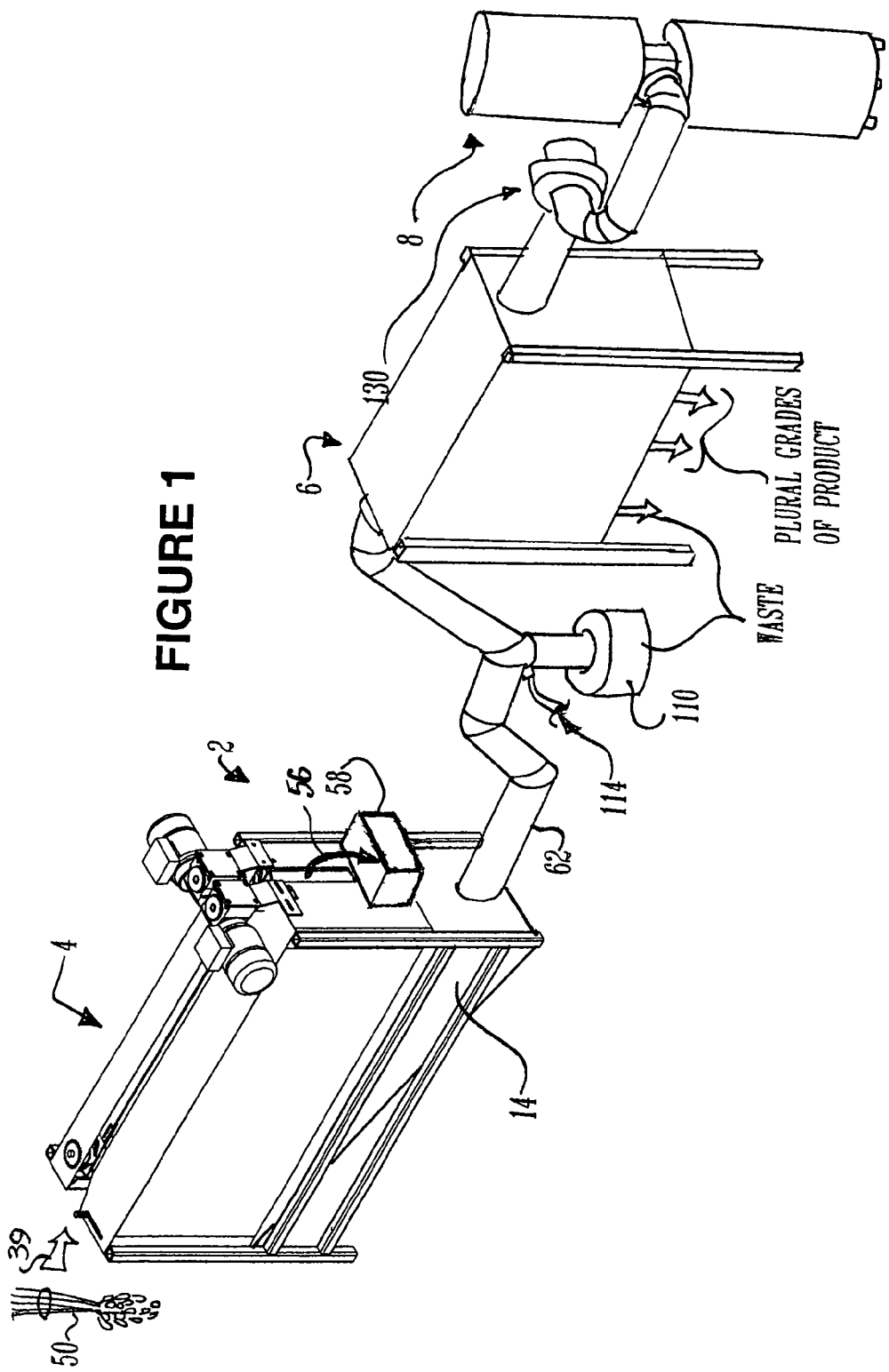
FIG. 1 shows in schematic the inventive system comprising the two main modules, the de-stemmer and the separator units.

Overall System: FIG. 1 shows the context of the inventive agricultural product processing apparatus system 2, being shown by way of example as processing a dried herbal product such as laven-der. As shown in FIG. 1, the multi-module agricultural product processing system comprises a de-stemmer unit 4, a separator unit 6, and a dust collector 8. The de-stemmer unit 4 receives the dried lavender bundles 50 oriented vertically with heads down at the left end labeled "input," separates the buds from the stems and leaves as the bundles 50 travel through the unit from left to right. The buds fall into a material (product) bin 14 along with minor stem parts and leaves as waste. Air conveyor 62 conveys the buds and minor waste (chaff) to the separator unit 6 for cleaning and classification. Some of the minor waste falls out during the air transport between the de-stemmer unit 4 and the separator/classifier 6, and is collected in container 110. Compressed air, fed in by hose 114, assists in transport and separation during transport between the units.

The separator unit 6 separates and partially or fully classifies the de-stemmed lavender buds (corollas and calyxes) from empty calyxes, minor stem and leaf debris, preferably by alternately pressurizing and then releasing (depressurizing) the input flow of the bud product and chaff. One simple mode of doing this is by means of a baffle system, which may be spring biased or balanced to release after a desired pressure build-up. The waste and plural grades of flower product fall at differing rates and collect at the base of the separator unit 6 in one or more bins beneath the unit 6. The product, in its various grades, and the separated waste (chaff) are emptied through individual, separate output hoppers at the base of the unit 6.

The system includes a dust collector 8, such as a baghouse or other dust filter system, to collect airborne dust and contaminants while the buds are being separated from empty calyxes, minor stem and leaf debris. As shown in FIG. 1, the dust collector 8 comprises two uncovered dust collector bags supported by a stand and inflated when the fan 130 is in operation. This fan is an induced draft fan with respect to the separator unit 6, and forced air with respect to the baghouse 8.

Figure 2:
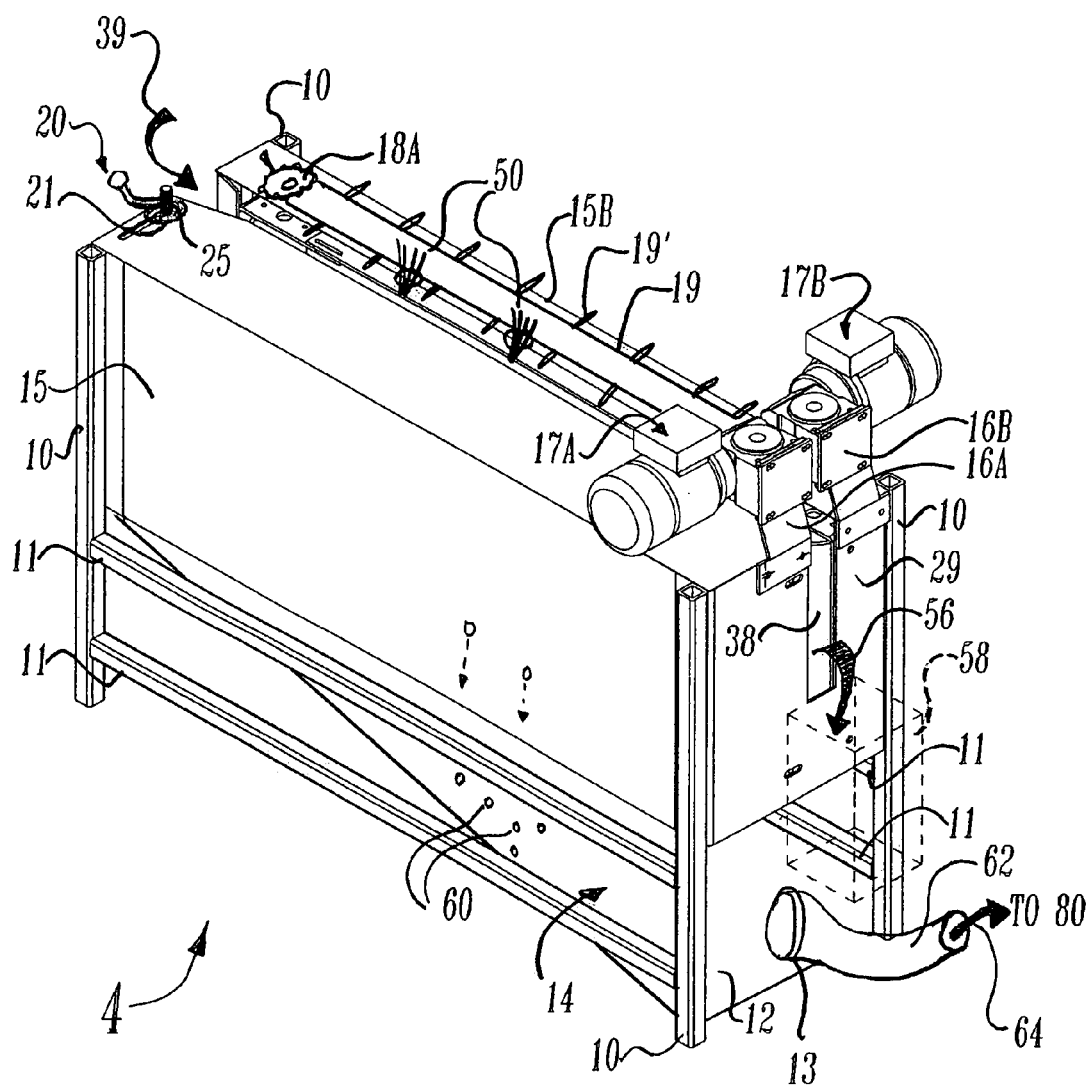
FIG. 2 shows an isometric elevated view of the de-stemmer unit with housing.

De-Stemmer Unit Module: Referring to FIG. 2, the de-stemming unit 4 comprises a rectangular housing made of sheet metal or suitable plastic having opposing front and back outer covers 15A, 15B, and opposing infeed and outfeed ends 39, 38 with respective openings. The housing is elevated and supported at each corner by vertical frame members 10. Opposed horizontal support frame members 11 are connected to the vertical frame members 10 to provide lateral support.

As shown in FIG. 2, opposed front and rear motors 17A, 17B, are secured on top of the housing above the outfeed end 38 and are attached to the housing with respective front and back motor brackets 16A, 16B. An optional waste stem collector basket 58 (shown in phantom) is attached to the housing at the base of the outfeed slot 38 to catch and collect the waste lavender stems 56 upon exiting the housing via slot 38. Positioning the motors on the top of the unit provides ease of maintenance or replacement and prevents contamination with product and chaff. The motors may include speed controllers.

A material bin 14, preferably transparent plastic, is attached to the vertical support frame members 10 at the base of the housing to collect de-stemmed lavender flower buds 60 and chaff. The base of the material bin 14 is angled downwards toward an end 12 wall at the out-feed end 38 of the de-stemmer unit 4 to assist the movement of the separated flower products' 60 toward an outlet 13 in end wall 12. The outlet 13 allows for the air-conveyed transfer of the primary product stream 64 (flower buds and minor debris) to the separator unit 6 through conduit 62.

Referring to FIG. 2, individual spikes or stems of lavender are grouped together, typically with a rubber band, string or twine in lavender bundles 50. The bundles fed by hand or conveyor into the input slot 39 of the de-stemmer unit 4 in a vertical position with the stems protruding upward and the wider portion of the bundle, consisting of the flower heads, downward. Bundles 50 typically consist of approximately 300 stems of dried lavender. The stems of bundle 50 protrude anywhere from a few inches to 6–8", depending on the length of the stem, from the top of the de-stemmer unit 4 as the bundles 50 are transported through the de-stemmer unit 4 from the input slot 39 towards the outfeed slot 38.

Figure 3:
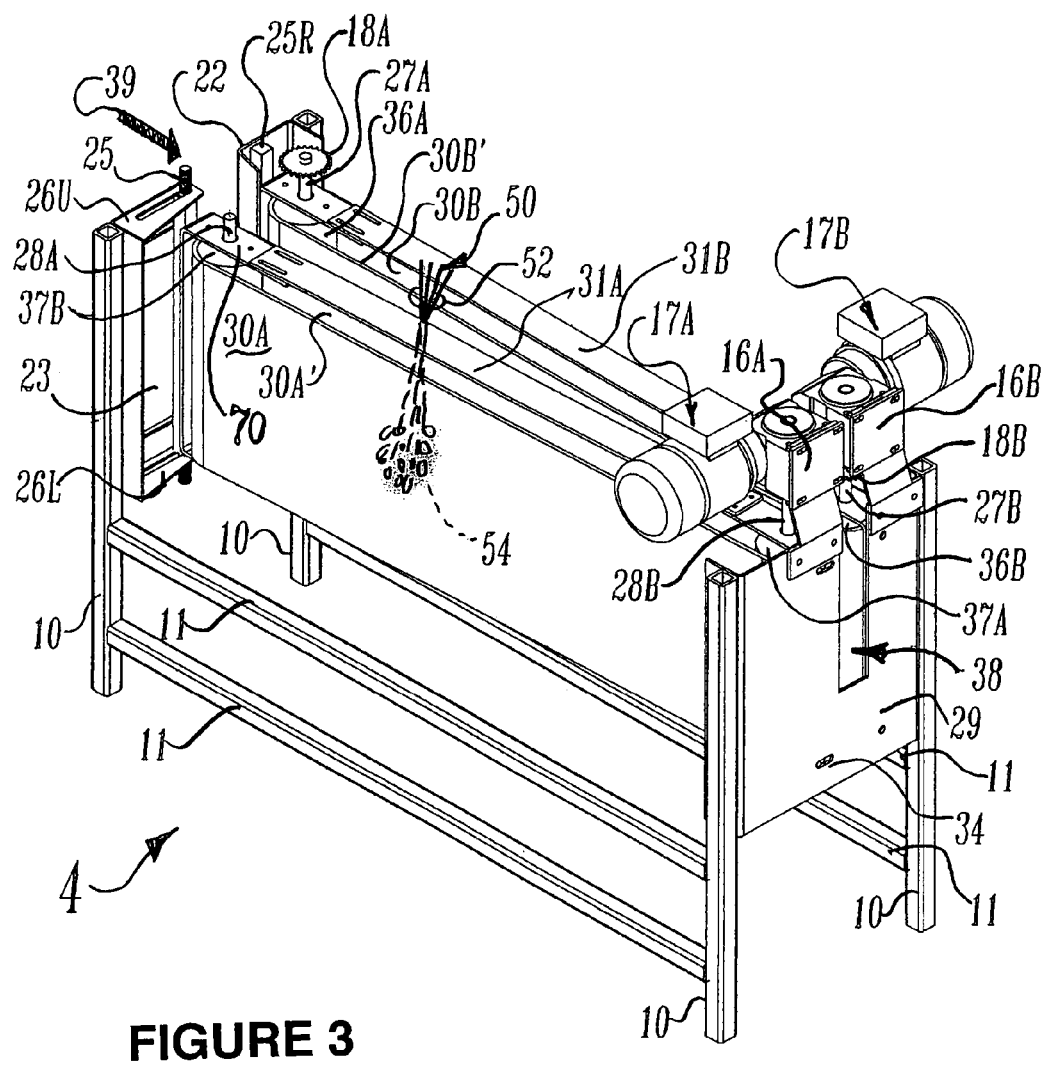
FIG. 3 shows an isometric elevated view of the de-stemmer unit without housing.

The lavender bundles 50 are held inside the de-stemmer unit 4 by friction against a pair of spaced, vertically-oriented opposing rotating belts 30A, 30B, best shown in FIG. 3. As shown in FIG. 2, the lavender bundles 50 are optionally kept vertically oriented and spaced along the direction of travel by a finger chain 19 with protruding fingers 19' located on top of the de-stemmer unit 4. The finger chain 19 rotates along the top of the housing guided by an idler sprocket 18A and a driven sprocket 18B rotationally operated by the rear motor 17B.

In an alternate embodiment, easily visualized but not shown in FIG. 2 to not clutter the drawing, an overhead endless conveyor, such as a chain having spaced swivels from which extend downwardly vertically hanging wire hooks on which bundles are hooked, suspend the bundles as they are transported through the de-stemmer unit. In this embodiment, the wire basket 58 may be omitted, as the residual stem bundles, with the flower heads/buds removed are conveyed to an unhooking/disposal station.

FIG. 3 illustrates the de-stemmer unit 4 with its outer front and back covers 15A, 15B removed to better show the pair of opposed front and rear belts 30A, 30B. The material bin 14 and waste basket 58 are also omitted for clarity. The belts 30A, 30B hold and move the lavender bundles 50 as they are horizontally transported in a vertical orientation from the input slot 39 towards the outfeed slot 38 (left to right in FIGS. 1–3). The belts 30A, 30B are wrapped around spaced-apart, opposing front and rear cylindrical drums 37A,B, 36B,A (front is the near longitudinal side and rear is the back, far side). At the center of each drum 36A,B, 37B,A are cylindrical shafts 27A, 27B, 28A, 28B, respectively, extending out of the top of the drums. The output end shafts 27B, 28B (on the right in FIG. 3), are connected to the motors 17A, 17B and are motor-driven to rotate, thereby rotating the belt drive drums 36B, 37A which in turn rotate the belts 30A, 30B. The numbering of the drums, belts and shafts reflects that in this embodiment, the belts are counter-rotating, which can be accomplished, for example, by an appropriate rotational orientation of the motors.

With respect to nip width adjustment, an adjustment rod 25 is attached to upper and lower brackets 70 which hold flanged bearings (not shown) in which the shaft 28A is journaled. Rod 25 is transversely movable in slotted plates 26U, 26L to permit adjustment of the width of the entry nip. The plates 26U and 26L may include ratchet steps or slots to act as stops spaced a predetermined distance apart to provide for a selection of settings. In the alternative, a clamp assembly may be used to provide finer, continuous adjustment. A similar rod and plate arrangement can be used at the back (e.g., with rod 25R) or at the output end if desired (not shown). In adjustable output end embodiment, one (or both) of the motors, 17A (or/and 17B) by way of example, is also secured to and moveable with the transverse adjustment assembly.

As the bundles 50 travel between the front and rear rotating belts 30A, 30B, the surface texture of the belts, preferably operating at differential speeds or counter-rotating, causes the bundles 50 to spin. The flower heads 54 turn with the friction caused by the spinning belts 30A, 30B. Head to head, bud to bud, and stem to bud or head contact creates additional friction. Friction also is caused by the different speeds of the belts 30A, 30B rubbing against the wider portion of the bundle comprising the flower heads 54, as opposed to the narrower portion of the bundle comprising stems only. The speed of each belt 30A, 30B may be adjusted by adjusting the power from the independent motors 17A, 17B to achieve the desired result for lavender bundles 50 of varying sizes and varying lavender flower species. Belt 30A, 30B speed may be varied with a motor speed controller or gearing from 0.1 feet/second to 1 foot/second. Belt speed differential may range from 0.1 to about 0.9 ft/sec. In the preferred embodiment, the front and rear belts 30A, 30B are 16 inches wide and 108 inches long, and are rough-surfaced transfer belts comprising polymer-reinforced rubber with a grip surface or grooved pattern.

As shown in FIG. 3, the pair of vertically-oriented belts 30A, 30B are positioned so that the distance between them decreases as the lavender bundles 50 travel from the input slot 39 towards the outfeed slot 38. This decreasing nip in the direction of travel advances the lavender bundle 50 as its diameter decreases due to the loss of flower heads 54 in the de-stemming process. The buds are also disengaged from their respective clusters as the space between the belts 30A, 30B narrows. When the lavender bundle 50 reaches the outfeed slot 38, the flower buds 60 have fallen away leaving only the stems, still connected by a band 52. The stems exit the outfeed slot 38 as waste, while the flower buds 60 and other minor debris (chaff) which have fallen to the material bin 14 (shown in FIG. 2) are vacuum or air conveyed to the separator unit 6.

Referring to FIG. 3, the nip width between the front and rear belts 30A, 30B may be adjusted to accommodate differing sizes and widths of lavender bundles 50 and varying lavender flower species. These adjustments may be made at the input slot 39 and/or at the outfeed slot 38. The front idler shaft 28A is mounted to a connecting rod 25 which is slidably adjustable in slotted brackets 26U and 26L to widen or narrow the distance between the front and rear belts 30A, 30B. The position of the front belt 30A may be adjusted at the output gap adjustment slot 34. The position of the rear belt 30B typically does not, but may, change.

Figure 4:
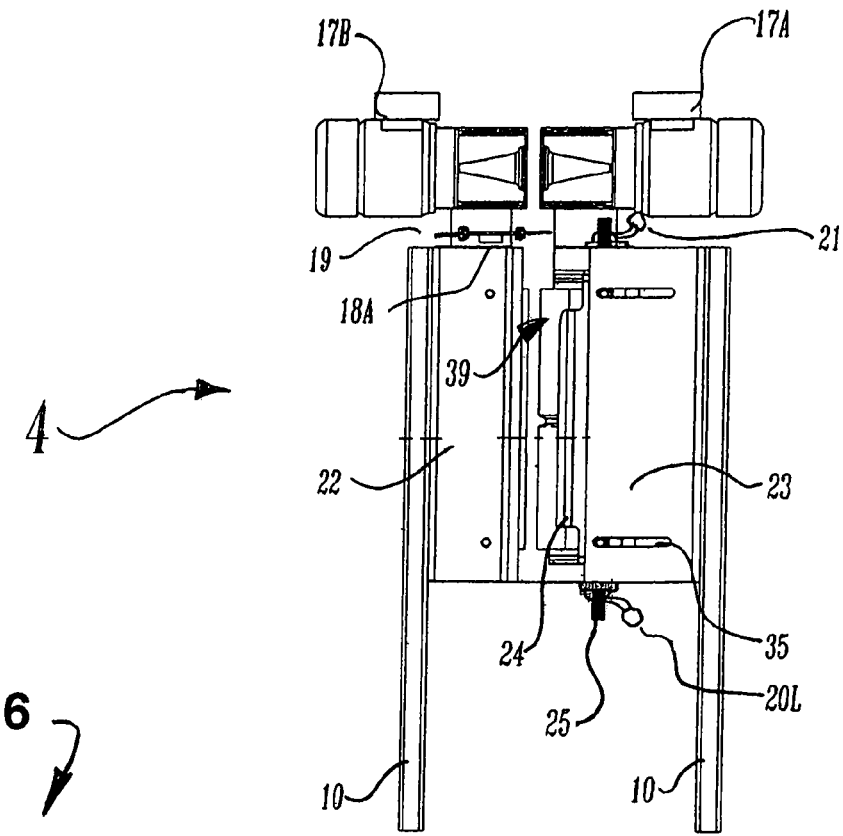
FIG. 4 shows a vertical elevation of the infeed end of the de-stemmer unit.

FIG. 4 illustrates the infeed end 39 of the de-stemmer unit. The lavender bundles 50 are hand-inserted in a vertical orientation, heads down, into the input slot 39 defined by the input rear bracket mounting plate 22 and the input front bracket mounting plate 23. The lavender bundles 50 are positioned at the time of insertion so that a few inches of the lavender bundle 50 stems extend out the top of the housing to allow for vertical orientation by the finger chain 19. Upon entering the input slot, the lavender bundle 50 is caught and held in position by the interior front and rear rotating belts 30A, 30B (shown in FIG. 3). The position of the front belt 30 (shown in FIG. 3) may be slidably adjusted at the input gap adjustment slot 35. Belt tooth orientation should be aggressive and vertically oriented.

Figure 5:
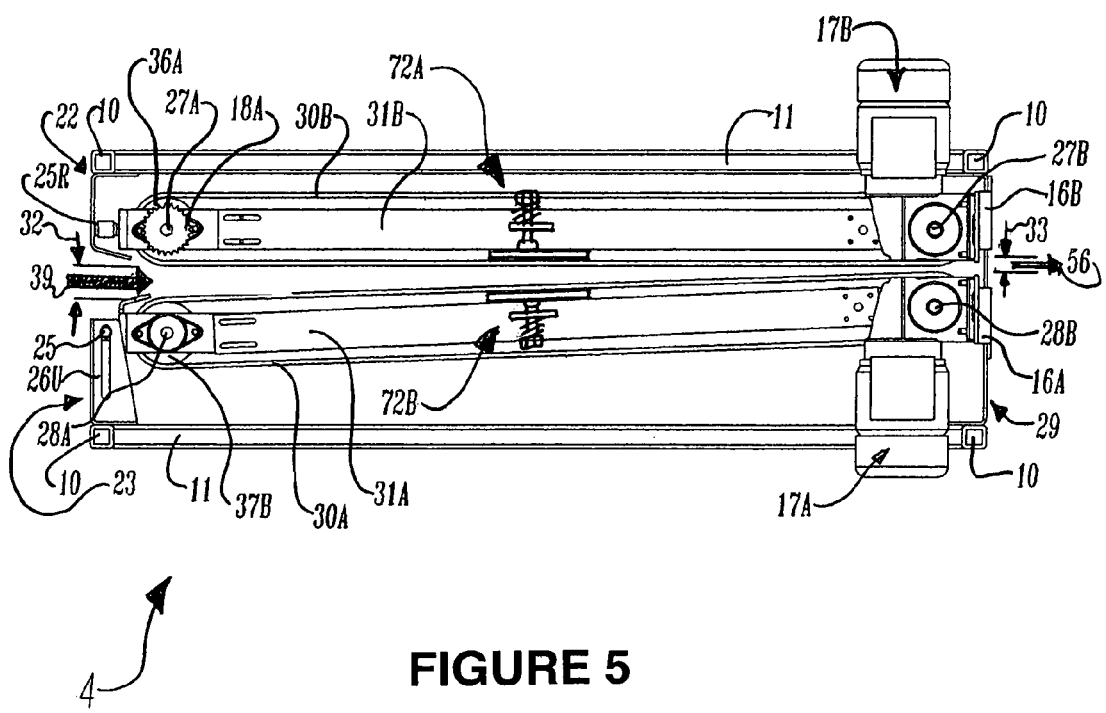
FIG. 5 shows a top plan view of the de-stemmer unit with belt bracking plates.

FIG. 5 is a top, plan view of the belt assembly with belt backing plates positioned against the belts 30A, 30B in the center of the de-stemmer unit 4, with the parts numbering being the same as in FIGS. 3 and 4, and showing backing plate assemblies 72 mounted centrally between the belt ends.

Figure 6:
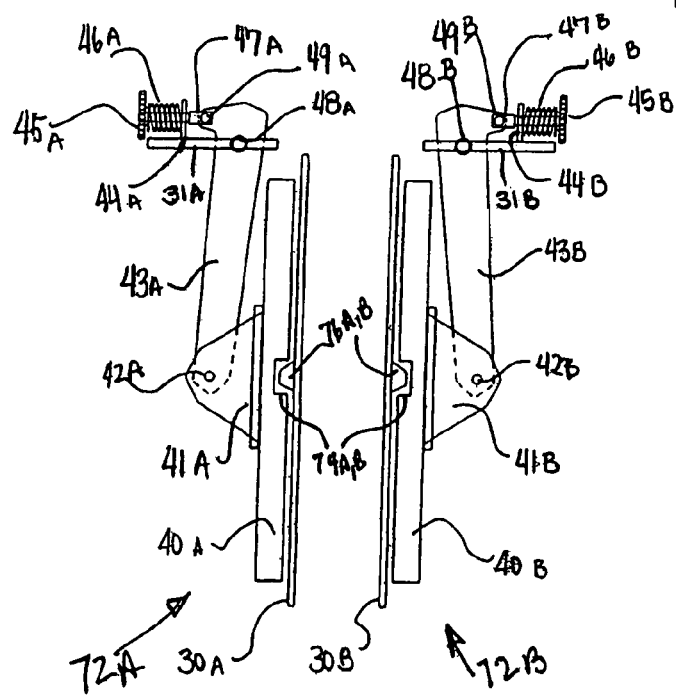
FIG. 6 shows a top plan view of a belt bracking plate on the de-stemmer unit.

FIG. 6 illustrates a side elevation view of the opposed belt backing plate assemblies 72. One or more opposed pairs of backing plate assemblies may be used along the belt path as in FIG. 5. The tension of the front and rear belts 30A, 30B may be adjusted by use of one or more smooth belt glide plates 40A,B (at one or more locations along the belts) to control the efficiency of the de-stemming process. These plates contact the back surface of the belts 30A, B, and may include a guide notch 74A, B within which a rib 76A,B on the back face of the belt rides to minimize vertical belt deflection induced by the mass of the lavender bundles. Each plate 40A,B includes a bracket 41A,B to which a bell crank 43A,B is connected by pivot pin 42A, B. The bell crank itself is pivoted on the spreader bar 31A,B, see FIG. 3, by means of pin 48A,B. The tension adjustment is accomplished by threaded rod 47A,B, which is connected by pin 49A,B to the short arm of the bell crank by pin 49A,B. The rod 47A,B is threaded through a threaded spring backing plate 44A,B. A spring 46A,B is captured between adjusting knob 45A,B and the spring plate 44A,B. Rotating the knob either advances or retracts the glide plate to provided the desired level of tension, while keeping the belts on track, the spring maintaining the proper tension pressure.

Figure 7:
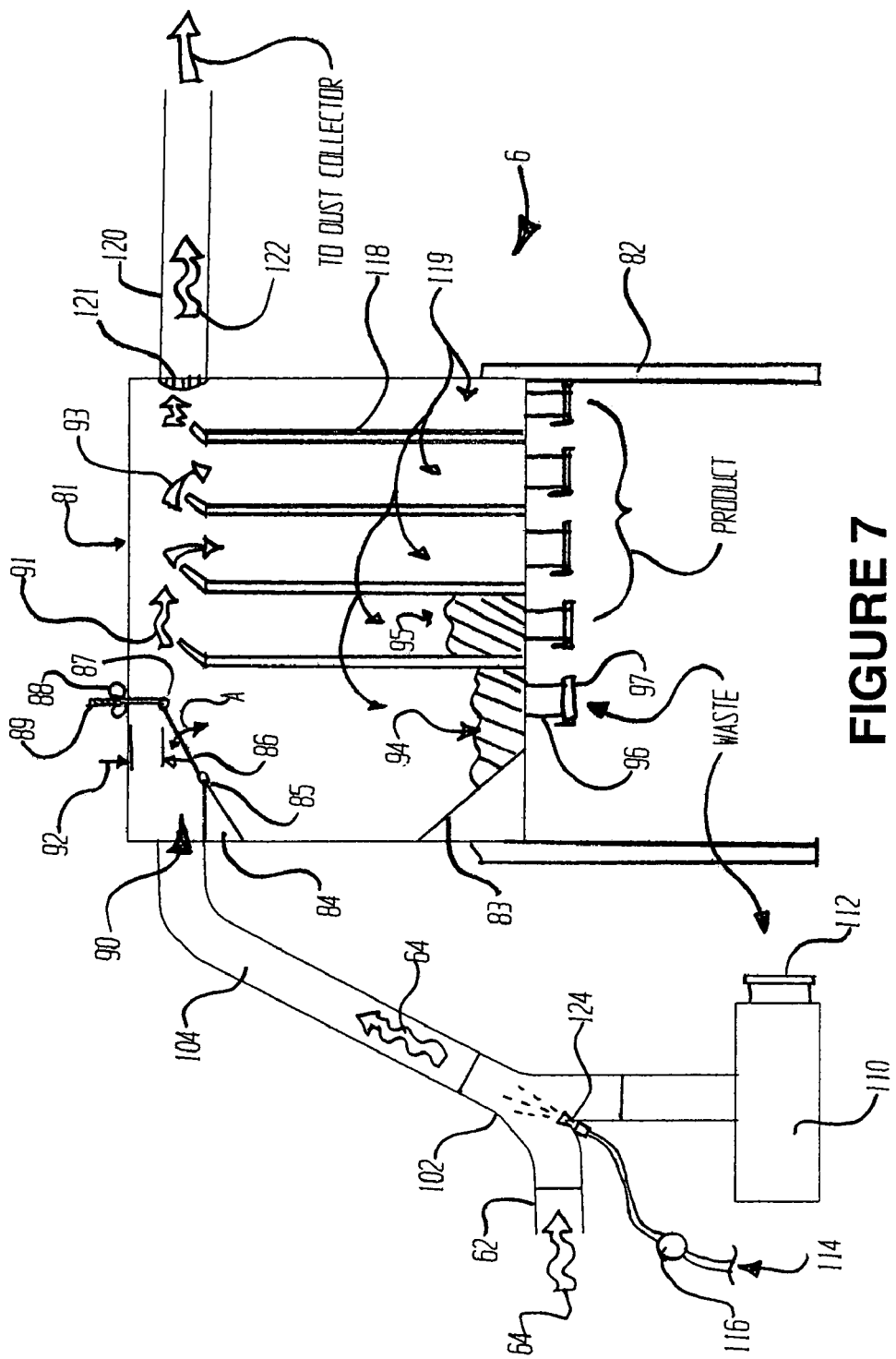
FIG. 7 shows a cross-sectional view of the separator unit.

Separator Unit Module: FIG. 7 shows a cross-sectional, generally schematic view of the separator unit 6 comprising a rectangular box-shaped enclosure 81, supported and elevated by legs 82 at each corner of the enclosure 81. The enclosure 81 contains means for pressurizing and releasing the primary product stream upon which the product is separated and classified into different grades.

As shown in FIG. 7, the flower product delivery conduit 62 connects the outlet 13 of the de-stemmer unit (shown in FIG. 2) to the separator inlet 90. The flower product delivery conduit 62 (also called the diffuser plenum delivery conduit 104) is inclined as it approaches the separator inlet 90. A compressed air inlet 124, inserted within the conduit 62, 104, releases and directs compressed air 114 upward into the inclined conduit 62, 104 to carry and move the product stream 64 towards the separator inlet 90. A waste stem parts bin 110 is attached to the conduit 62, 104 below the compressed air inlet 124. The stem bin 110 is open at the top to receive product waste (stem pieces) falling back down the conduit 62, 104 as the product streams upwards towards the separator inlet 90. The stem bin 110 has a door 112 which remains closed while the system is in operation, but which may be opened for periodic cleaning out of waste materials from the stem bin 110.

The product stream 64 is forced upwards through the inclined conduit 62, 104 by the force of the compressed air ejected by the compressed air inlet 124 and may be assisted by the induced draft fan 130 of the dust collector 8 (shown in FIG. 1). As the product stream 64 travels up the inclined slope of the conduit 62, 104, heavier portions of the product stream (small remaining stem bits, particulate, and other waste) are pulled downwards by gravity into the stem bin 110. The lighter flower buds and minor debris 64 continue to flow upwards and arrive at the separator inlet 90 ready for separation and classification. The positioning of the air inlet 124 and the amount used, as controlled by regulator 116, is only shown schematically, it being well within the skill of the art to select the most efficient location in the conduit 62 and flow depending on the product being handled.

In one exemplary embodiment, when the product stream 64 initially reaches the separator inlet 90, it enters the enclosure 81 in an accelerated, fluidized state. As the product stream 64 flows through the separator inlet 90 into the enclosure 81, the product stream 64 is pressurized by being forced against an inclined deflector 86. The deflector 86 is pivotally connected to a ramp 84, attached securely to the interior portion of the enclosure 81 immediately below the separator inlet 90. The deflector 86 is pivotally connected by a hinge 85 to the ramp 84. The deflector 86 is held at an inclined angle creating a venturi gap 92 between the top of the deflector 86 and the enclosure 81. The deflector 86 is supported from above by a deflector adjusting screw 89. The screw 89 protrudes through the top of the enclosure 81 and is adjustably fastened to the enclosure 81 with a wing nut 88. The deflector 86 swings in an arc (shown as "A" in FIG. 7) to release the pressurized product stream 91 which accelerates past the deflector 86. Upon passing through the venturi gap 92, the fluidized, accelerated product stream 91 begins to spin in the air, and decreases in velocity as the pressure is reduced and as it flows laterally. Individual lavender buds/calyxes/corollas 93 fall towards the base of the enclosure 81.

It should be understood that any other suitable air classification system can be used internal of the separator 81, including conventional, commercially available separators, including centrifugal (cyclonic-type) separation, differential air stream separators, or off-a-belt vacuum separators. An example of the latter type separators is use of an ITW-Vortec brand transvector-type air amplifier that can be tuned to discriminate between only slightly differing weights of materials to suck the buds off a belt-conveyed stream.

The buds 93 and other material are classified by size and weight into separate bins 119 defined by vertical separating baffles 118 positioned within the enclosure 81. The separating baffles 118 extend vertically from the base of the enclosure 81. Openings defined by the top of the baffles 118 and the top of the enclosure 81 allow for entry of the falling product stream 93 into the separate bins 119. Portions of the fluidized product stream 93 fall at different rates, thereby classifying itself. The heavier stems and leaves 94 (constituting waste) fall first and collect at the base of the enclosure 81, followed by more desirable lighter buds and stems 95, each grade separated by the vertical separating baffles 118, and each grade containing lighter lavender product. An important aspect of the invention is the cleaning process that occurs in the separation unit 6 as the buds, chaff and dirt separate.

Dust Collection Unit Module: Airborne dust and particulates continue in a stream of air to the dust collector 8 without falling out into the base of the enclosure 81 with the product stream 91, 93. The airborne dust and particulates are fully entrained in the air and are carried through a dust flow conduit 120 out the separator inlet 90 to the dust collector 8, FIG. 1. The circular opening to the dust flow conduit 120 is covered with a screen 121 preventing product stream 93 from escaping the enclosure 81 while allowing airborne dust and particulates 122 to flow to a dust collector 8 (shown in FIG. 1). Dust 122 is drawn into and through the conduit 120 by the ID fan 130 of the dust collector 8 (shown in FIG. 1).

Once the desired amount of product has been separated and classified into the respective bins 119, the dust collector 8 creating the vacuum force for dust 122 collection is turned off, and the lavender buds and waste may be removed from the bins 119. The grades of lavender product collect in output hoppers 96 attached to the underlying base of the enclosure 81 under each respective bin 119. Airtight gate valves 97 at the base of each output hopper are kept closed during the separating process, but may be opened to allow the grades of lavender product to flow out of the hoppers for collection. The waste material 94 is discarded, and the final product is ready for commercial use.

Figure 8:
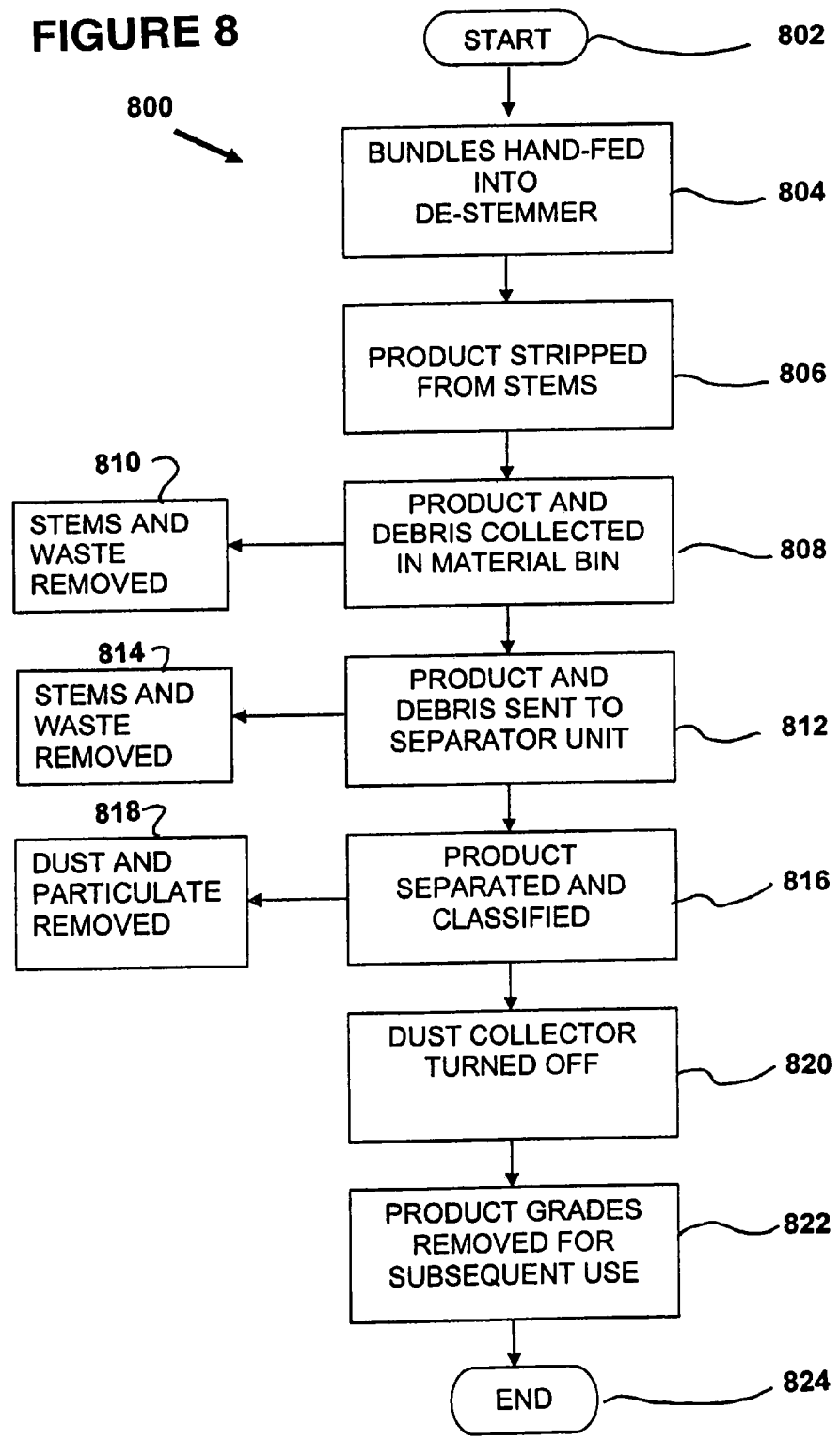
FIG. 8 is a flow-chart of the inventive lavender processing system.

Process for De-Stemming and Separating Dried Lavender: FIG. 8 is a flow diagram of the inventive process 800. In Step 804, the lavender bundles are manually or machine-fed into the de-stemmer. In Step 806, the flower buds are stripped from the stems. In Step 808, the flower buds and other minor debris are pulled by gravity into the product bin 14. In Step 810, the remaining stems exit the outfeed slot and are collected in a stem basket. In Step 812, the flower buds and minor debris are air-conveyed to the separator unit. In Step 814, additional stem and minor debris is collected while the product is traveling through a conduit, for example an inclined conduit. In Step 816, clean flower buds are separated from the remaining stem and other minor debris. In Step 818, the dust and organic particulate matter is collected. In Step 820, the dust collector is turned off, thereby stopping the vacuum force within the separator. In Step 822, the clean flower buds are removed for subsequent use.

FIG. 9 shows several alternatives for a V-shaped floor member of the de-stemmer unit hopper 14. FIGS. 9A and 9B are a side elevation and isometric of a V-shaped hopper 14 that helps the product 60 be guided toward the outlet 13 and the delivery conduit. In FIG. 9B, the outlet is triangular shaped which can be fitted with an appropriate triangle-to-round transition union (not shown). FIG. 9C is a side elevation view of the hopper in which a compressed air feed 114 is provided at the upper end to assist in moving the flower parts product to the conduit 62. For example, and air knife-type air flow amplifier can be used to direct the product to the outlet 62.

FIGS. 10A and 10B show in plan view the use of a static plate in association with one or more moving belts. In FIG. 10A a single plate 98A is shown in operative position with a single belt 30 A. Two plates can be used, one on each side of the belt for 2 nips. In FIG. 10B, the plate 98B has ribbed or textured surfaces on both sides to provide dual product processing nip paths between the respective plate faces and the belts 30A and 30B. The plate surface "tooth" or texture may be provided by adhering or otherwise securing belting material to a metal plate. Thus, the nip is broadly defined as the space between a belt and an opposed surface, e.g., a plate.

INDUSTRIAL APPLICABILITY

It is clear that the inventive lavender processing apparatus system and method of this application has wide applicability to the lavender industry, namely to the efficient and clean collection of dried lavender flower buds for potpourri, sachet, and oil collection. The system has the significant commercial advantage of reducing the time to process a bundle of 300 dried lavender stalks from about 3 minutes to 4 seconds or less. In addition, the recovered flower buds are in condition equivalent to hand processing without the necessity of manual labor. The system also allows for the processing of lavender in its typical format following drying, i.e., a bundle of dried lavender stems and flowers connected with a rubber band or other means, without the need to separate the bundles into individual stalks. Thus, the inventive lavender processing system, as fitting within current processing operations, has the clear potential of becoming adopted as the new standard for apparatus and methods of processing dried lavender.

It should be understood that various modifications within the scope of this invention can be made by one of ordinary skill in the art without departing from the spirit thereof and without undue experimentation. For example, the de-stemmer unit and separator unit can have a wide range of designs to provide the functionalities disclosed herein. The separator unit can be a series of progressively finer screens, the upper, larger ones capturing the stem bits, the middle ones the product, the lower ones the chaff, and the dust falling through. A fluidized bed step (up-flowing air) can be used for secondary cleaning of the product. This invention is therefore to be defined by the scope of the appended claims as broadly as the prior art will permit, in view of the specification if need be, including a full range of current and future equivalents thereof.

The invention claimed is:

1. An agricultural product processing apparatus system for post-harvest processing of dried herbals such as lavender comprising in operative combination:
   a. a powered mechanical de-stemming unit for separating dried lavender flower buds from bundles of harvested, dried lavender, including an assembly for separating the stems from the bud product and a hopper for collection of the bud product separate from residual stems; and
   b. a separator unit connected to the bud product hopper of said de-stemmer unit, including a conveyor from said de-stemming unit bud product hopper to transport the bud product to an input port of said separator, said separator including at least one assembly for separating dust and residual material from said buds and to collect dried flower buds as end-product for separate discharge, and an exhaust outlet for discharge of dust.

2. Apparatus system as in claim 1 wherein said conveyor employs air flow to transport said bud product in a duct to said separator, and which includes a dust collector unit connected to said separator unit for collection of air-borne dust exhausted from said separator unit.

3. Apparatus system as in claim 2 wherein said separator includes air flow therein to classify and separate residual materials and dust from said buds end-product.

4. Apparatus system as in claim 1 wherein said de-stemmer apparatus includes at least one powered endless belt mounted on rollers spaced apart in a longitudinal direction and defining an inlet end and an outlet end, said belt being spaced from an opposed surface generally coextensive with the longitudinal extent of said belt, said belt-to-surface space defining a bundle-processing nip extending generally parallel to and the length of said belt between said rollers within which bundles of harvested, dried lavender are introduced at said inlet end, said belt is driven relative to said surface to produce a rotational motion to said bundles thereby separating flower parts from said stems, and residual stem bundles are discharged at said outlet end.

5. Apparatus system as in claim 4 wherein said belt and said surface are mounted so that the nip is adjustable in width at least at one end of said assembly.

6. Apparatus system as in claim 5 which includes at least a pair of opposed spaced belts.

7. Apparatus system as in claim 6 which includes a static plate disposed between said two belts to provide a spaced opposed surface for each belt and define two bundle-processing nips for doubling the throughput of said de-stemming apparatus.

8. Apparatus system as in claim 6 wherein said belts are both driven in a direction selected from counter-rotating and co-rotating, and said apparatus includes at least one speed controller for independently controlling the speed of said belts.

9. Apparatus system as in claim 8 wherein the surface of at least one belt has tooth to assist bundle rotation.

10. Apparatus system as in claim 4 wherein said nip is oriented generally vertically, and said bud products hopper is located below said nip.

11. An agricultural product de-stemming apparatus for post-harvest processing of dried herbals such as lavender comprising at least one powered endless belt mounted on rollers spaced apart in a longitudinal direction and defining an inlet end and an outlet end, said belt being spaced from an opposed surface generally coextensive with the longitudinal extent of said belt, said belt-to-surface space defining a bundle-processing nip extending generally parallel to and the length of said belt between said rollers within which bundles of harvested, dried lavender are introduced at said inlet end, said belt is driven relative to said surface to produce a rotational motion to said bundles thereby separating flower parts from said stems, and residual stem bundles are discharged at said outlet end.

12. Apparatus system as in claim 11 wherein said belt and said surface are mounted so that the nip is adjustable in width at least at one end of said assembly.

13. Apparatus system as in claim 12 which includes at least a pair of opposed spaced belts.

14. Apparatus system as in claim 13 which includes a static plate disposed between said two belts to provide a spaced opposed surface for each belt and define two bundle-processing nips for doubling the throughput of said de-stemming apparatus.

15. Apparatus system as in claim 13 wherein said belts are both driven in a direction selected from counter-rotating and co-rotating, and said apparatus includes at least one speed controller for independently controlling the speed of said belts.

16. Apparatus system as in claim 11 wherein the surface of at least one belt has tooth to assist bundle rotation.

17. Apparatus system as in claim 11 wherein said nip is oriented generally vertically, and said bud products hopper is located below said nip.

18. Method for processing post-harvest dried herbals such as lavender comprising the steps of:
   a) rotating bundles of harvested dried lavender between spaced opposed surfaces to separate dried lavender flower buds product from residual stems; and
   b) collecting the buds product separate from said residual stems.

19. Method for processing as in claim 18 wherein said opposed surfaces include at least one movable belt, said space defining a nip along which said bundles travel, and including the step of controlling the rate of travel of said bundles along said nip.

20. Method for process as in claim 18 which includes the step of separating lavender flower buds from minor debris and dust to produce a substantially clean lavender bud product.

* * * * *